July 23, 1963  M. H. ESTKOWSKI ETAL  3,098,321
MARKER SEED TABS
Filed May 2, 1961
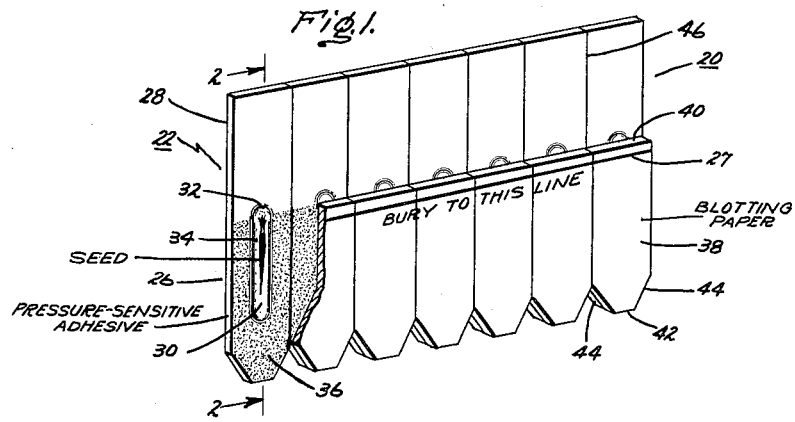
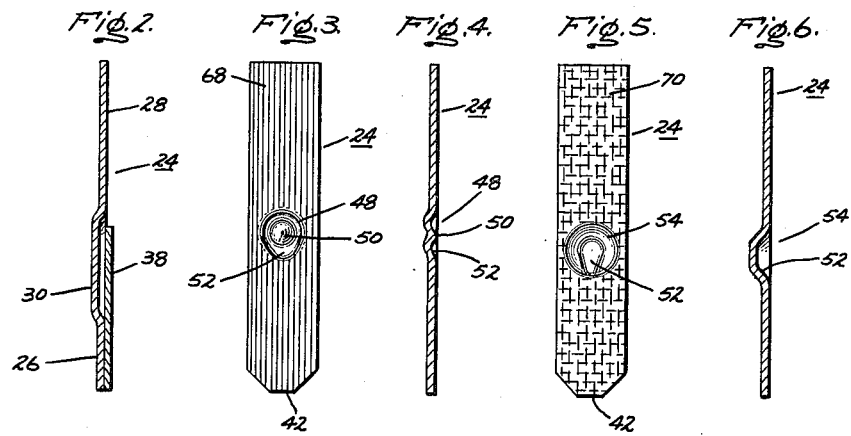
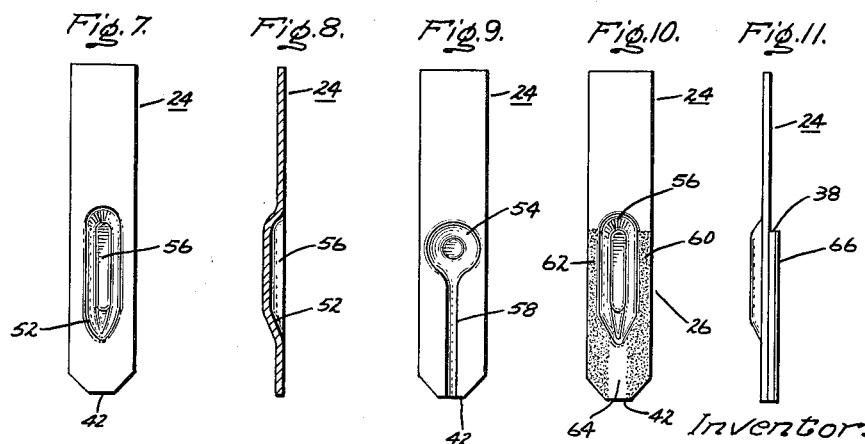
Inventors:
Michael H. Estkowski,
Jerald V. Dunlap,
by Just & Irish
Attorneys.

United States Patent Office 3,098,321
Patented July 23, 1963

3,098,321
MARKER SEED TABS
Michael H. Estkowski, Los Angeles, Calif. (R.R. 2, P.O. Box 757, St. Joseph, Mich.), and Jerald V. Dunlap, 2045 Mandeville Canyon Road, Los Angeles 49, Calif.
Filed May 2, 1961, Ser. No. 107,219
13 Claims. (Cl. 47—56)

This invention relates generally to the planting of seeds, such as flower, vegetable and tree seeds, and more particularly to an improved marker seed tab device which facilitates germination and planting of such seeds.

In the conventional method of planting small quantities of flower, vegetable or tree seeds, a small depression or hole is made in the soil to what is believed to be the correct depth for the particular type of seed being planted, and what is believed to be the correct quantity of seed is then deposited in the hole, with the seed or seeds then being covered over with soil. It will be readily apparent that with such prior planting methods, there is a considerable possibility for error both in the depth of planting and the number of seeds planted. In instances where it is desirable to germinate seeds under controlled environmental conditions, it has been the practice initially to plant the seeds in a tray or flat, and following germination and sprouting of the seedlings to transplant physically the seedlings to the desired location; such a procedure is obviously both laborious and wasteful of seed.

In co-pending continuation-in-part application Serial No. 57,846 of Michael H. Estkowski, there is described and illustrated a marker seed tab comprising an elongated tab proportioned to have one end inserted in the soil at a predetermined level with the other end thereof projecting above the soil. In this prior marker seed tab, one end portion of the tab has at least a part of one surface thereof coated with adhesive material with a predetermined number of seeds adhered thereto and with a layer of blotting paper adhered to the adhesive material, thus covering and protecting the seed. A plurality of such prior marker seed tabs may be joined edgewise initially to form a card for mechandising purposes, and the tabs may be subsequently separated for individual use.

We have found that certain improvements in the marker seed tab device as described and illustrated in the aforementioned Estkowski application greatly facilitate germination of the seed, environmental control and manufacture of marker seed tabs, and it is accordingly an object of our invention to provide an improved marker seed tab of the type described and illustrated in the aforementioned Estkowski application.

Our invention in its broader aspects provides a marker seed tab comprising an elongated flat tab proportioned to have one end portion thereof inserted in the soil to a predetermined level with the other end portion thereof projecting above the soil. The tab is formed of stiff, relatively thin, self-supporting material, such as plastic, and the end portion which is inserted in the soil has an indentation formed in one surface thereof. A predetermined quantity of seed is positioned in the indentation and a relatively thin layer of absorbent material is adhered to and covers at least a part of the surface of the tab in which the indentation is formed, thus covering the seed.

Further objects of our invention will become apparent by reference to the following description and the accompanying drawings, and the features of novelty which characterize our invention will be pointed out with particularity in the claims annexed to and forming a part of this specification.

In the drawings:
FIG. 1 is a view in perspective, partly broken away, showing a plurality of edgewise joined marker seed tabs incorporating an embodiment of our invention;

FIG. 2 is a cross-sectional view taken along the line 2—2 of FIG. 1;

FIG. 3 is a side view of a marker seed tab in accordance with our invention having a differently shaped indentation formed therein;

FIG. 4 is a cross-sectional view of the marker seed tab of FIG. 3;

FIG. 5 is a view of a marker seed tab having another form of indentation;

FIG. 6 is a cross-sectional view of the marker seed tab of FIG. 5;

FIG. 7 is a view of a marker seed tab having yet another form of indentation;

FIG. 8 is a cross-sectional view of the marker seed tab of FIG. 7;

FIG. 9 is a view of a marker seed tab showing a root groove joining the indentaion to the bottom end of the tab;

FIG. 10 is a view of a marker seed tab in accordance with our invention showing the preferred method of applying adhesive thereto; and FIG. 11 is a side view showing another embodiment of our invention.

Referring now to FIGS. 1 and 2, there is shown a card 20 comprising a plurality of initially edgewise joined marker seed tabs 22. Each marker seed tab 22 comprises a tab element 24 formed of suitable relatively thin self-supporting material which will not be crumpled when inserted in the soil. Each tab element 24 has a lower end portion 26 adapted to be inserted in the soil to a predetermined level, indicated by line 27, and an upper portion 28 which projects above the soil level 27. An elongated, axially extending identation or groove 30 is formed in the lower end portion 26 with its upper extremity 32 extending into the upper portion 28, as shown. The desired seed 34, shown here as being a single marigold seed, is positioned in the indentation 30 at a predetermined location with respect to the soil level 27 determined by the particular seed, seed 34 preferably being adhered to the bottom of the indentation 30 by suitable adhesive.

In the embodiment shown in FIGS. 1 and 2, one surface of the lower end portion 26 is completely coated with a suitable adhesive 36 and a cover 38 of suitable porous material, such as blotting paper or felt, is adhered thereto, thus covering and protecting the seed 34. The line 27 to which the marker seed tab 22 is to be inserted or buried in the soil is preferably imprinted upon the cover 38, as shown. It will be observed in FIGS. 1 and 2 that the upper extremity 32 of the indentation 30 extends above the upper extremities 40 of covers 38, thus being exposed to permit emergence of the seedling from the indentation 30.

The adhesive 36 and also the adhesive employed for adhering the seed in the indentation 30 is preferably of he pressure-sensitive type.

The center section 42 of the bottom end of each marker seed tab 22 is preferably blunt, as shown, with the side edges 44 tapering upwardly and outwardly as shown.

Tab elements 24 are preferably formed from a sheet of plastic material such as vinyl or polystyrene. Indentations 30 may be molded in the surfaces of tab elements 24, formed in a press operation or vacuum formed. Transversely extending, longitudinally evenly spaced-apart separation lines 46 are formed in a press operation, which also forms the blunt ends 42 and tapered sides 44, formation of the separation lines 46 cutting completely through the sheet of blotting paper to thus define the individual covers 38. It will be readily seen that the formation of the separation lines 46 defines the individual marker seed tabs 22, which can thus be readily separated one from another, as desired.

In a specific example of the embodiment of FIGS. 1 and 2, individual tabs 22 are ½ inch wide, 2½ inches long, being formed of polystyrene .020 inch thick. In this specific example, the covers 38 are 1¼ inches long, formed of 120-pound Royal Worcester blotting paper (uncoated) .020 inch thick with the adhesive 36 being Permacel Adhesive No. 4128. In this specific example, indentation 30 was approximately ⅞ inch long, ⅛ inch wide and ¹⁄₃₂ inch deep.

Referring now to FIGS. 3 and 4, in which like elements are indicated by like reference numerals, there is shown a tab element 24 prior to the application of the adhesive 36 and the cover 38. Here, the indentation 48 is generally circular with a re-entrant or reverse projection or dimple 50 formed at the center thereof. This arrangement is particularly advantageous for very small seed, since the adhesive is applied to the projection 50 and the seed in turn adhered thereto. This arrangement thus accurately controls the size of a small adhesive area, and thus in turn the number of seed, without the requirement for an equally small sized adhesive applicator. It will be seen that the wall 52 of indentation 48 on the side adjacent or facing end 42 of tab element 24 has a more gradual slope than the remaining portion of the wall of indentation 48, thus providing a smoothed-out root channel which guides the root downwardly as it grows out of the confines of the indentation 48. In a specific example of the embodiment of FIGS. 3 and 4, indentation 48 has a diameter of approximately ¼ of an inch, a depth of approximately ¹⁄₃₂ inch, and with the usable area of projection 50 being on the order of ¹⁄₃₂ inch in diameter, projection 50 being slightly shorter than the depth of the recess 48, i.e., slightly below the plane of the surface of tab element 24 upon which the adhesive 36 is applied.

Referring now to FIGS. 5 and 6, in which like elements are still indicated by like reference numerals, here, for larger generally round seed, indentation 54 is again generally circular, without, however, having the re-entrant projection 50 of FIGS. 3 and 4. Indentation 54 preferably is provided with a smoothed-out root channel 52 in its wall adjacent end 42. In one specific example of the embodiment of FIGS. 5 and 6, indentation 54 had a radius of ⁵⁄₁₆ inch at the surface of tab element 24, a radius of ³⁄₁₆ inch at its bottom and a depth of approximately ¹⁄₁₆ inch. In another specific example of the embodiment of FIGS. 5 and 6, indentation 54 had a diameter at the surface of tab element 24 of ⅜ inch, a diameter at its bottom of ¼ inch and a depth of ¹⁄₁₆ inch.

Referring now to FIGS. 7 and 8, in which like elements are still indicated by like reference numerals, here the tab element 24 is provided with an elongated axially extending indentation 56 somewhat wider and deeper than the indentation 30 of FIGS. 1 and 2 and also having the smoothed-out root channel portion 52 at its end adjacent the end 42 of tab element 24 as shown. In a specific example of the embodiment of FIGS. 7 and 8, indentation 56 was one (1) inch long, ⁵⁄₁₆ inch wide and ¹⁄₁₆ inch deep.

Referring now to FIG. 9, there is shown a marker seed tab having an indentation 54 of the types shown in FIGS. 5 and 6 in which a root channel or groove 58 is formed communicating between end 42 and the indentation 54. Thus it will be seen that the root of the seedling formed in indentation 54 is guided or channeled down the groove 58.

Referring now to FIG. 10, in which a tab element 24 is shown having an indentation 56 of the type shown in FIGS. 7 and 8, in the preferred embodiment of our invention the adhesive is applied to the surface of lower end portion 26 of tab element 24 in two spaced-apart belts or strips 60 and 62 which are seen to be respectively located on either side of indentation 56, the space 64 between the adhesive belt 60 and 62 communicating between indentation 56 and end 42. It will now be readily seen that the ends 42 of our improved marker seed tabs are preferably blunted, as shown in all of the figures, in order to insure that the cover 38 is adequately adhered to the tab element 24. If the bottom end of tab 24 of FIG. 10 was pointed, a small section at the tip of the cover 38 would not be adhered to the tab element 24 by virtue of the space 64 between the adhesive belts 60 and 62 and this unadhered tip of the cover would tend to separate from the tab element 24 and thus peel or rip off of the tab element as the tab is inserted in the soil.

In the embodiments shown in FIGS. 3 through 10, the upper extremity of the cover 38 preferably exposes a portion of the indentation, as in the case of the embodiment of FIGS. 1 and 2.

Different seeds require different specific sets of environmental conditions for germination and growth, these conditions including temperature, moisture, air and light. Different varieties of seeds do not respond alike to the same conditions, e.g., petunia seeds will not germinate properly if they are at temperatures below 60° F. whereas pansy seeds will not germinate if they are at temperatures above 60° F. With the improved marker seed tab of our invention, the seeds will germinate when the ends 42 of card 20 are inserted in plain water; the covers 38 act as a wick to convey the water to the seed. When the seedlings have grown to the height of the upper end of the card, the individual tabs may be separated one from the other and individually inserted in soil for further growth. It will be readily apparent that the roots of the seedlings are protected by the cover 38 and that the pregerminated seedlings are thus readily and safely transplanted. Thus, with our improved marker seed tab, seeds can be germinated indoors where temperatures are uniform and controllable. In the case of some seeds which require warmer temperatures for germination, a relatively thin layer 66 of plastic material, such as polystyrene or vinyl, may be adhered to the outer surface of cover 38 as shown in FIG. 11; this protective jacket 66 preferably has a thickness of about half that of tab element 24 and cover 38, and is preferably coextensive with the cover 38. This jacket 66 reduces evaporation of moisture from the cover 38 during the initial germination period, with the resultant lowering of the temperature due to such evaporation. With the jacket 66, a plastic water vapor barrier is provided on both sides of the cover 38.

As indicated, the card 20 of our improved marker seed tabs may have their lower ends 42 immersed in water in a shallow pan or dish which may then be placed in a sunny window or a cool location, depending upon the temperature requirements of the seed. Further, and again depending upon the temperature requirements of the particular seed, the tab elements 24 may be appropriately colored either to absorb or reflect heat and light radiation. Thus, as shown in FIG. 3, the tab 24 may be darkly colored, as shown at 68, thus to absorb radiation, or as shown in FIG. 5, the tab may be lightly colored as at 70 to reflect radiation. The tab 24 may also be made of transparent plastic to transmit light to the seed.

It will now be seen that we have provided an improved marker seed tab construction in which the quantity of seed is accurately controllable during manufacture of the device, and in which germination of the seed and emergence of the seedling and the root are greatly facilitated.

While we have illustrated and described specific embodiments of our invention, further modifications and improvements will occur to those skilled in the art and we desire therefore in the appended claims to cover all modifications which do not depart from the spirit and scope of our invention.

What is claimed is:

1. A marker seed tab comprising: a vertically elongated rigid flat tab proportioned to have one end portion thereof driven into soil to a predetermined level with the other end portion thereof projecting above the soil, said tab being formed of stiff relatively thin self-supporting material, said one end portion having an indentation formed in one surface thereof; a predetermined quantity of seed positioned in said indentation; and a relatively thin layer of moisture-absorbent material adhered to and covering at least a part of said one surface of said one end portion, said layer covering at least a portion of said indentation defining a cavity therewith and covering said seed, said seed being secured to a wall of said cavity, said cavity being proportioned to permit emergence of a seedling thereupon.

2. A marker seed tab comprising: a vertically elongated rigid flat tab proportioned to have one end portion thereof driven into soil to a predetermined level with the other end portion thereof projecting above the soil, said tab being formed of stiff relatively thin self-supporting material, said one end portion having an indentation formed in one surface thereof; a predetermined quantity of seed positioned in said indentation; and a relatively thin layer of moisture-absorbent material adhered to said one surface of said one end portion, said layer of moisture-absorbent material covering said one end portion and having one end extending transversely across said indentation defining a cavity therewith and exposing a portion thereof thereby permitting a seedling to emerge therefrom, said seed being adhered to a wall of said cavity.

3. The combination of claim 2 wherein said indentation is in the form of an elongated axially extending groove.

4. The combination of claim 2 wherein said indentation is generally circular.

5. The combination of claim 2 wherein said indentation has an outwardly projecting portion generally in the center thereof, said seed being adhered to said projecting portion.

6. The combination of claim 2 wherein the portion of the wall of said indentation adjacent the end of said one end portion has a slope more gradual than the slope of the remaining portion of said wall thereof defining a channel for downwardly guiding the root of a seedling.

7. The combination of claim 2 wherein said one surface of said one end portion of said tab has a narrow axial groove formed therein extending from said indentation toward the end of said one end portion for downwardly guiding the root of a seedling.

8. The combination of claim 2 wherein said layer of moisture-absorbent material is adhered to said one surface by adhesive applied in two axially extending transversely spaced-apart strips, the space between said strips communicating between said indentation and the end of said one end portion thereby defining a channel for downwardly guiding the root of a seedling.

9. The combination of claim 2 wherein said layer of moisture-absorbent material is adhered to said one surface by adhesive applied in two axially extending transversely spaced-apart strips, the space between said strips communicating between said indentation and the end of said one end portion thereby defining a channel for downwardly guiding the root of a seedling, said end of said one end portion having a blunt section in the center thereof generally corresponding to the width of said space, said one end having edges tapering outwardly respectively from the ends of said blunt section.

10. The combination of claim 2 wherein said layer of moisture-absorbent material is adhered to said one surface and said seed is adhered in said indentation by pressure sensitive adhesive.

11. The combination of claim 2 wherein said tab is formed of moisture impervious plastic material and further comprising a relatively thin layer of moisture impervious plastic material adhered to the outer surface of said layer of moisture-absorbent material and coextensive therewith whereby said layer of moisture-absorbent material has water vapor barriers on both sides thereof.

12. The combination of claim 2 wherein said layer of moisture-absorbent material is formed of blotting paper.

13. The combination of claim 2 wherein said layer of moisture-absorbent material is formed of felt.

References Cited in the file of this patent

UNITED STATES PATENTS

| | | |
|---|---|---|
| 1,380,253 | Rodger | May 31, 1921 |
| 2,281,927 | Fischer | May 5, 1942 |
| 2,571,491 | Schindler | Oct. 16, 1951 |

FOREIGN PATENTS

| | | |
|---|---|---|
| 74,703 | Austria | Sept. 25, 1918 |